(12) United States Patent
Meis et al.

(10) Patent No.: US 9,134,196 B2
(45) Date of Patent: Sep. 15, 2015

(54) INLET ICING PROTECTION SIMULATION SYSTEM

(75) Inventors: Charles Steven Meis, Renton, WA (US); David Charles Hass, Renton, WA (US)

(73) Assignee: The Boeing Company, Chicago, IL (US)

( * ) Notice: Subject to any disclaimer, the term of this patent is extended or adjusted under 35 U.S.C. 154(b) by 334 days.

(21) Appl. No.: 13/598,223

(22) Filed: Aug. 29, 2012

(65) Prior Publication Data

US 2014/0060166 A1 Mar. 6, 2014

(51) Int. Cl.
*G01M 9/08* (2006.01)
*G01M 9/06* (2006.01)
*B64D 15/04* (2006.01)
*G01M 17/00* (2006.01)

(52) U.S. Cl.
CPC ............. *G01M 9/08* (2013.01); *B64D 15/04* (2013.01); *G01M 9/06* (2013.01); *G01M 17/00* (2013.01)

(58) Field of Classification Search
CPC ......... G01M 9/02; G01M 9/04; G01M 9/062; G01M 9/065; G01M 9/067; G01M 9/08; G01N 17/002
See application file for complete search history.

(56) References Cited

U.S. PATENT DOCUMENTS

| 4,688,745 | A | 8/1987 | Rosenthal | |
| 2002/0017383 | A1* | 2/2002 | Vincent | 165/204 |
| 2004/0130072 | A1* | 7/2004 | Sekido et al. | 264/408 |

OTHER PUBLICATIONS

Allyn Heinrich, et al. "Engine Inlet Anti-icing System Evaluation Procedure" Jan. 1980.*
Extended European Search Report, dated Jul. 30, 2015, regarding Application No. EP131740771.1, 6 pages.

* cited by examiner

*Primary Examiner* — Paul West
(74) *Attorney, Agent, or Firm* — Yee & Associates, P.C.

(57) ABSTRACT

A method and apparatus for generating a flow of heated air in an airfoil model of an inlet of an aircraft engine. Heated air is sent into a duct system associated with the airfoil model of the inlet of the aircraft engine. The heated air is circulated within the airfoil model of the inlet of the aircraft engine using the duct system in a manner that simulates air flowing in the inlet of the aircraft engine.

19 Claims, 12 Drawing Sheets

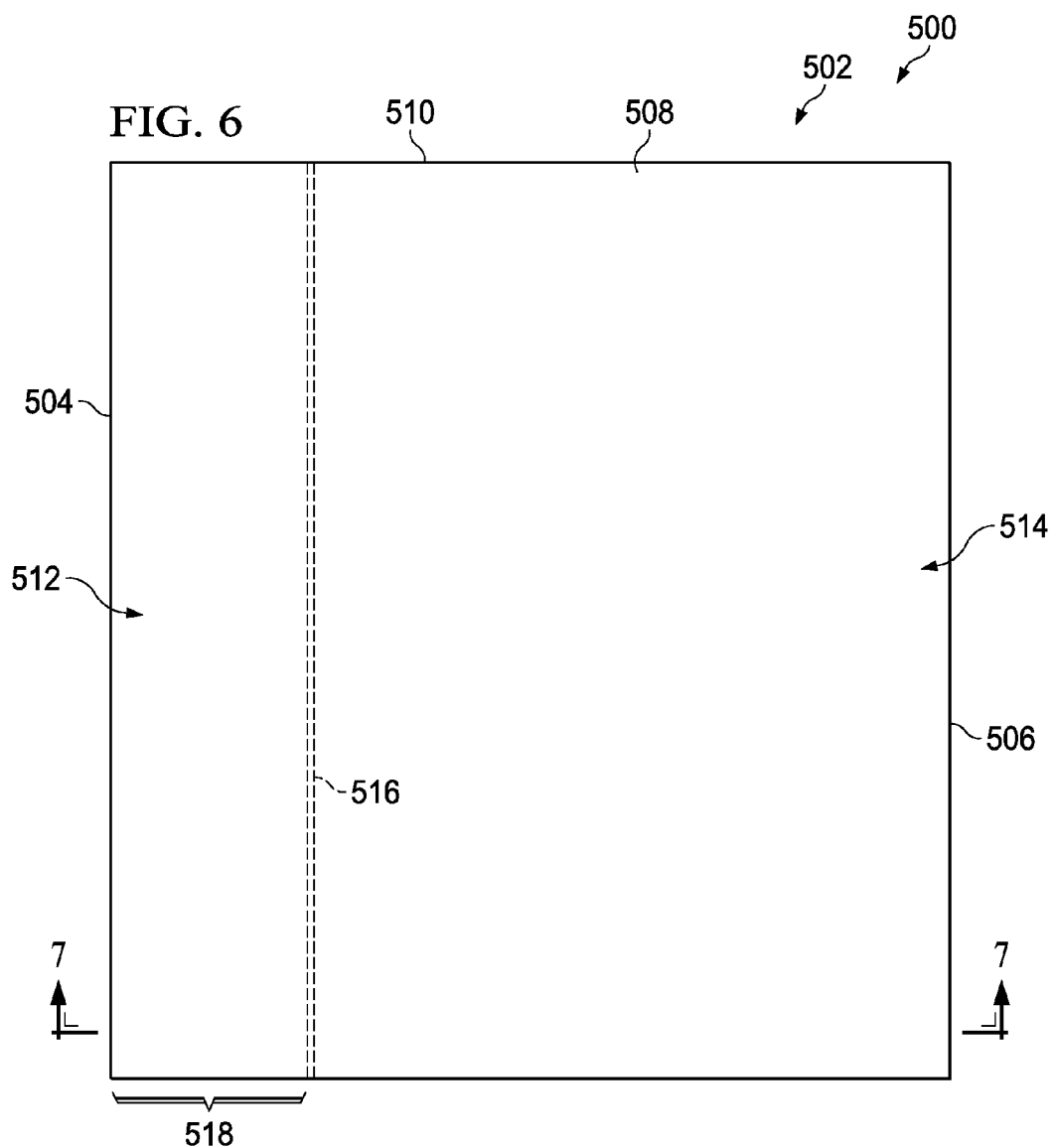
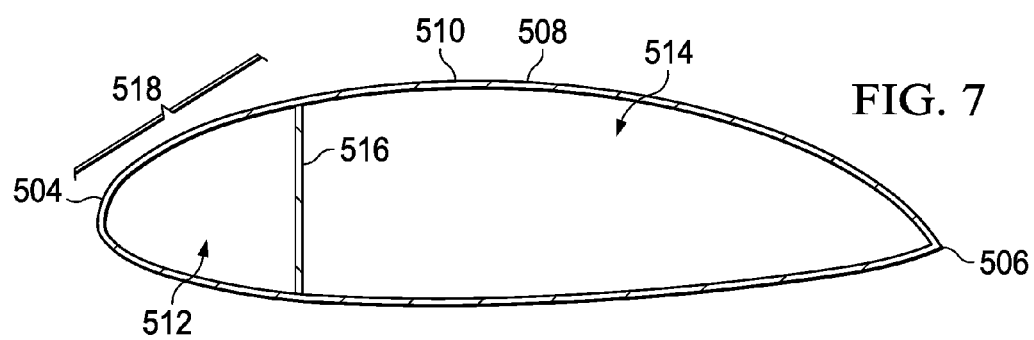

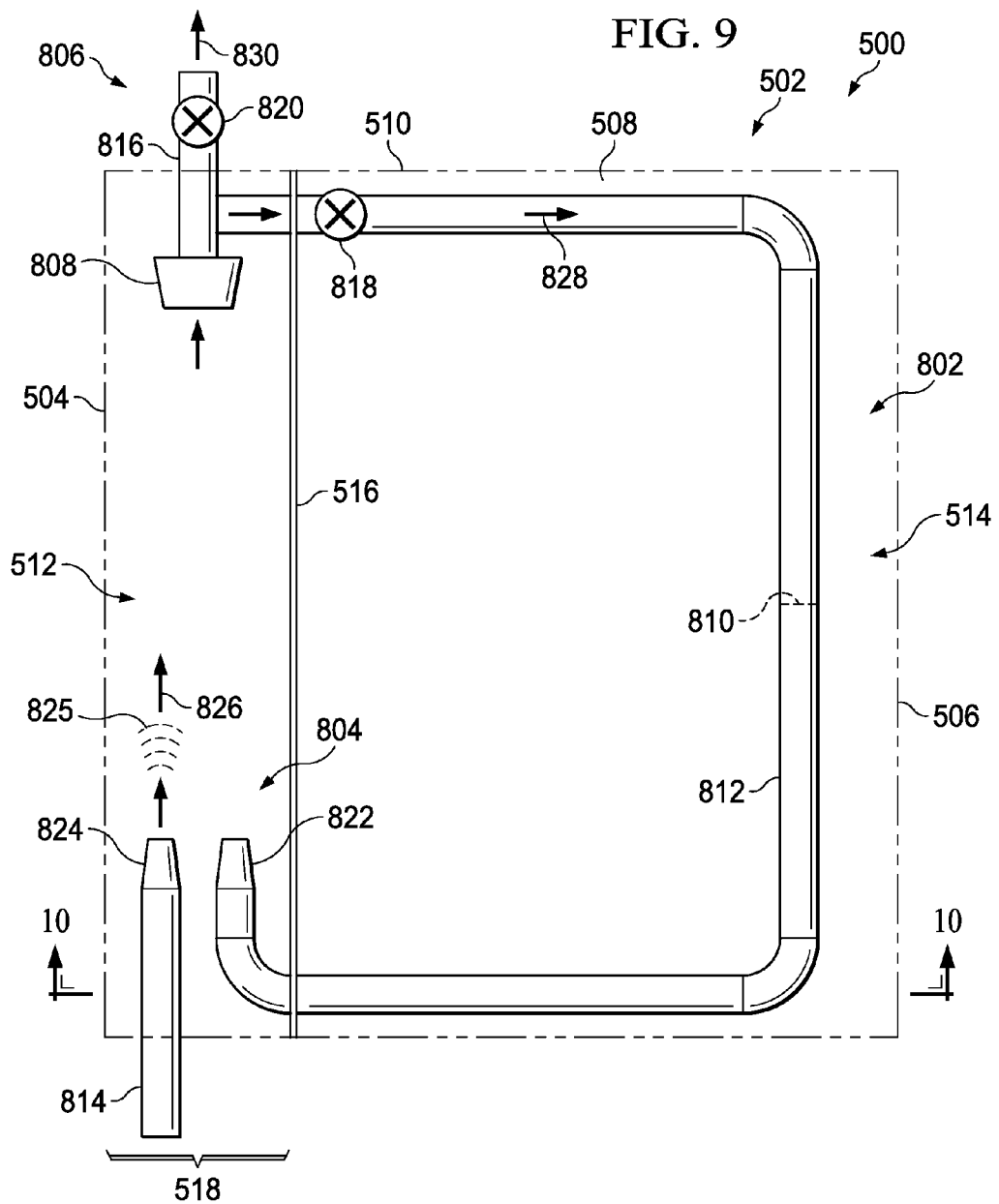
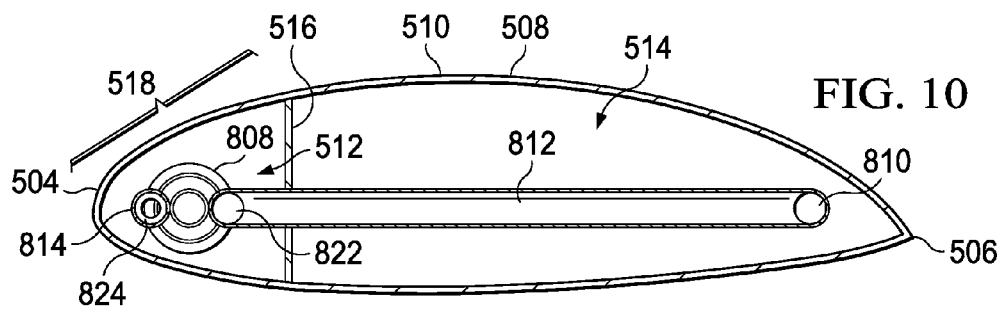

INLET ICING PROTECTION SIMULATION SYSTEM

BACKGROUND INFORMATION

1. Field

The present disclosure relates generally to aircraft and icing conditions and, in particular, to simulating icing conditions for aircraft. Still more particularly, the present disclosure relates to a method and apparatus for simulating operation of an inlet ice protection system in an icing condition.

2. Background

In aviation, icing on an aircraft may occur when the atmospheric conditions lead to the formation of ice on the surfaces of the aircraft. Further, this ice also may occur within the engine. Ice formation on the surfaces of the aircraft, on inlets of an engine, and other locations is undesirable and potentially unsafe for operating the aircraft.

Icing conditions may occur when drops of supercooled liquid water are present. Water is considered to be supercooled when the water is cooled below the stated freezing point for water but is still in liquid form. Icing conditions may be characterized by the size of the drops, the liquid water content, the air temperature, and/or other parameters. These parameters may affect the rate and extent at which ice forms on an aircraft.

Drops of water may be supercooled in various environments. For example, drops of water may be supercooled in stratiform clouds and in cumulous clouds.

When icing occurs, the aircraft may not operate as desired. For example, ice on the wing of an aircraft may cause the aircraft to stall at a lower angle of attack. Further, icing on the wing may case the aircraft to and have an increased drag.

Aircraft may have mechanisms to prevent icing, remove ice, or some combination thereof to handle these icing conditions. For example, aircraft may include ice protection systems that detect icing on the aircraft, prevent ice from forming on the surface of the aircraft, remove ice from the surface of the aircraft, or some combination thereof. Ice may be prevented from forming on the surface of the aircraft using bleed air, infrared heating, and other suitable mechanisms.

Different government regulations may define types of icing conditions that are to be considered during the design of an aircraft and the certification of the aircraft. The regulations may require the use of icing protection systems to protect different surfaces, such as surfaces on the wing, fuselage, and engine, from icing conditions as part of a certification process for an aircraft.

Analysis and testing of aircraft designs is often conducted using simulations of icing conditions performed in wind tunnels. These wind tunnels are configured to imitate environments in which the aircraft operate where icing conditions may be present. These types of wind tunnels may be referred to as icing wind tunnels.

Testing icing protection systems with aircraft structures may be more difficult than desired due to the size, complexity, and other factors that may be present with particular types of aircraft structures.

For example, some aircraft structures may be larger than desired for testing in an icing wind tunnel. In other words, the size of an icing wind tunnel may limit what structures may be tested in the icing wind tunnel.

Additionally, some icing protection systems may be complex. The complexity of the icing protection system may make testing the icing protection system in an icing wind tunnel more difficult than desired. For example, the icing protection system for an aircraft may involve numerous control systems, wires, power sources, and other components. Connecting these different components to structures of an aircraft in an icing wind tunnel may be more difficult for testing than desired. As a result, testing icing protection systems may be more difficult than desired.

Therefore, it would be desirable to have a method and apparatus that takes into account at least some of the issues discussed above, as well as other possible issues.

SUMMARY

In one illustrative embodiment, an apparatus comprises a heating system. The heating system is configured to generate a flow of heated air in an airfoil model of an inlet of an aircraft engine in which the flow of the heated air simulates air flowing in the inlet of the aircraft engine.

In another illustrative embodiment, a heating system is configured to generate a flow of heated air in an airfoil model of an aircraft structure. The airfoil model of the aircraft structure is configured to be exposed to icing conditions during operation of an aircraft in which the flow of the heated air simulates air flowing in the aircraft structure.

In yet another illustrative embodiment, a method for generating a flow of heated air in an airfoil model of an inlet of an aircraft engine is presented. The heated air is sent into a duct system associated with the airfoil model of the inlet of the aircraft engine. The heated air is circulated within the airfoil model of the inlet of the aircraft engine using the duct system in a manner that simulates air flowing in the inlet of the aircraft engine.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a top view of an airfoil model in accordance with an illustrative embodiment;

FIG. 7 is an illustration of a cross section of an airfoil model in accordance with an illustrative embodiment;

FIG. 9 is an illustration of a top view of an airfoil model with a heating system in accordance with an illustrative embodiment;

FIG. 10 is an illustration of a cross-sectional view of an airfoil model with a heating system in accordance with an illustrative embodiment;

DETAILED DESCRIPTION

Figure 1:
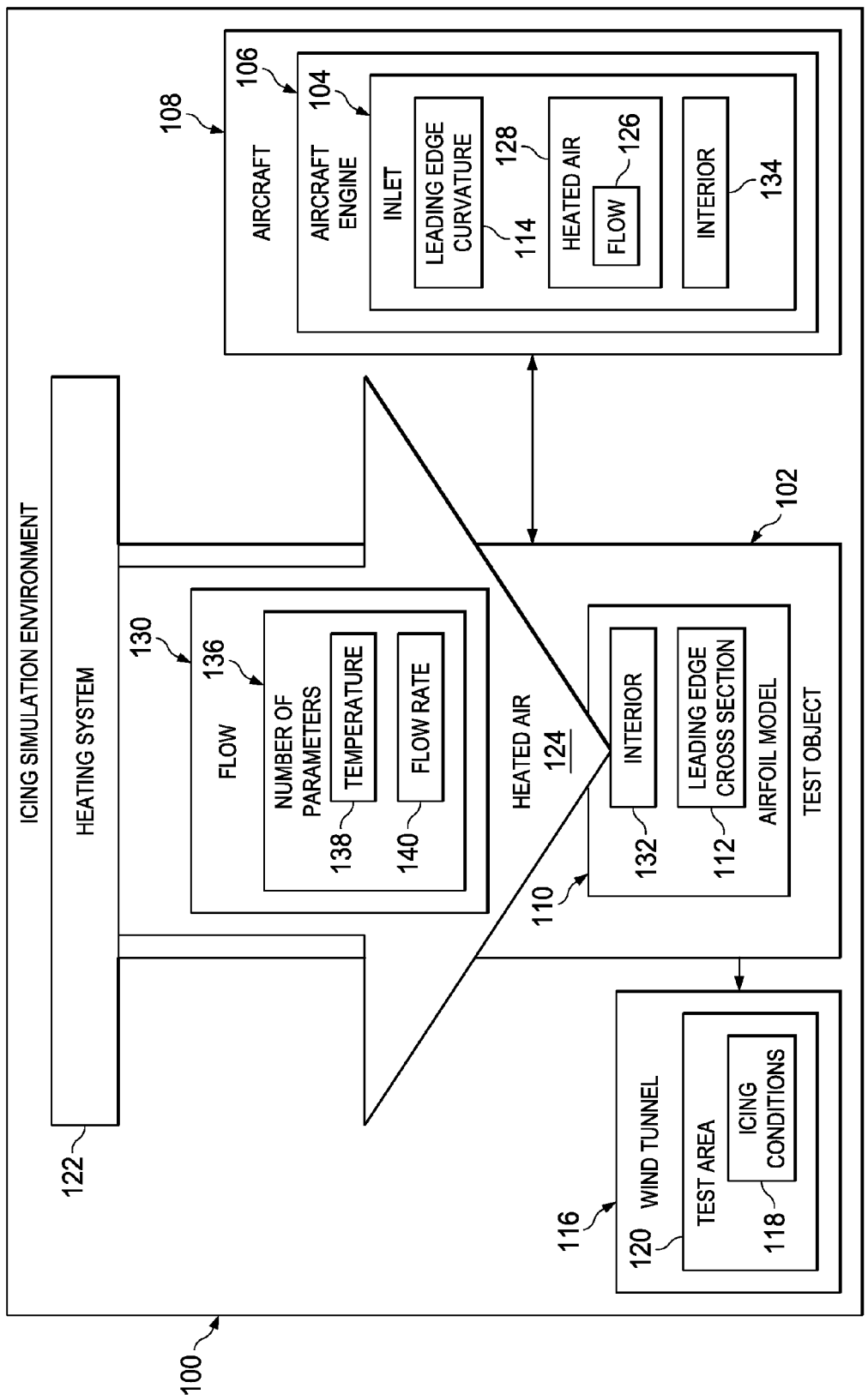
FIG. 1 is an illustration of a block diagram of an icing simulation environment in accordance with an illustrative embodiment.

The illustrative embodiments recognize and take into account one or more different considerations. For example, the illustrative embodiments recognize and take into account that a cross section or a portion of an aircraft structure may be placed in the icing wind tunnel rather than the entire aircraft structure if the icing wind tunnel is unable to accommodate the entire aircraft structure. For example, a cross section of a wing, a stabilizer, or an inlet for the aircraft engine may be placed in the icing wind tunnel.

Further, the illustrative embodiments also recognize and take into account that even though cross sections of structures may be used, the complexity of the icing protection systems also may make it difficult to determine whether an icing protection system will perform as desired in icing conditions using an icing wind tunnel. For example, the illustrative embodiments recognize and take into account that some icing protection systems may provide protection for the inlet of an engine of an aircraft. This type of icing protection system may use bleed air or heated air from another source such as an auxiliary power unit. Bleed air is heated air from the engine of the aircraft. This heated air may be sent into the interior of the inlet of the engine.

In this manner, the heated air heats the inlet in a manner that provides protection against icing conditions. One type of icing protection system includes the design of the inlet with the use of heated air. The illustrative embodiments recognize and take into account that testing this type of icing protection system may be difficult because of the size and complexity of aircraft engines and the size limitations of icing wind tunnels that are currently available.

The illustrative embodiments recognize and take into account that the inlet may be simulated using an airfoil model for a cross section of the inlet. However, the heating of the model of the inlet may not provide a desired simulation of the icing protection system. For example, the simulation of the bleed air heating provided by an engine may be simulated using electric heater mats installed in an inner surface of the leading edge of the airfoil model for the inlet for the aircraft engine.

The illustrative embodiments recognize and take into account that the use of electric heater mats to heat the leading edge of the inlet may require large amounts of electrical power. As a result, modifications to the icing wind tunnel may be desired to provide the needed amount of electrical power.

Further, the use of electric heater mats may require different settings to provide a desired simulation of hot bleed air from an aircraft engine. Testing and analysis may be performed to identify correct electric heater mat settings. This testing and analysis may add to the complexity of testing the inlet for the aircraft engine.

Also, with the use of electric heater mats, these electric heater mats may not simulate the manner in which the inlet for the aircraft engine is heated through bleed air as accurately as desired. As a result, further actual flight testing may be performed to validate the results from icing wind tunnel testing for at least some of the testing conditions.

Thus, the illustrative embodiments recognize and take into account that it would be desirable to test designs of inlets for aircraft engines with heating systems that provide a more desired simulation of the hot bleed air that originates from aircraft engines.

In one illustrative embodiment, an apparatus comprises a heating system. The heating system is configured to generate a flow of heated air in an airfoil model of an inlet that simulates air flowing in the inlet of an aircraft engine.

In this manner, an aircraft engine is not needed for providing bleed air in the wind tunnel. Further, the heating system generates a flow of heated air that more closely simulates the bleed air as compared to using electric heater mats mounted to the interior surface of the inlet.

With reference now to the figures and, in particular, with reference to FIG. 1, an illustration of a block diagram of an icing simulation environment is depicted in accordance with an illustrative embodiment. In this illustrative example, icing simulation environment 100 may be used to simulate icing conditions 118.

As depicted, wind tunnel 116 is configured to simulate icing conditions 118 in test area 120 of wind tunnel 116 for an aircraft structure. This aircraft structure may be test object 102. Different types of icing conditions may be simulated in wind tunnel 116. For example, wind tunnel 116 may simulate icing conditions 118 in which different sizes of supercooled liquid water drops are present.

In these illustrative examples, inlet 104 in aircraft engine 106 of aircraft 108 may be larger than desired for testing in wind tunnel 116. As a result, inlet 104 may not be suitable for testing as test object 102 in wind tunnel 116. Consequently, test object 102 may take the form of airfoil model 110 for inlet 104 in aircraft engine 106 of aircraft 108.

As depicted, airfoil model 110 is a cross section of inlet 104. In particular, airfoil model 110 has leading edge cross section 112 that matches leading edge curvature 114 of inlet 104 in aircraft engine 106. In other words, leading edge cross section 112 of airfoil model 110 may provide the same airflow as leading edge curvature 114 of inlet 104.

Further, interior 132 of airfoil model 110 may have a configuration that corresponds to interior 134 of inlet 104. In other words, the size and shape of interior 132 of airfoil model 110 corresponds to interior 134 of inlet 104.

In this illustrative example, leading edge cross section 112 and interior 132 of airfoil model 110 are substantially planar rather than curved as is the case in leading edge curvature 114 and interior 134 for inlet 104. However, in some illustrative examples, leading edge cross section 112 of airfoil model 110 may have a similar curve as inlet 104 such that the cross section substantially matches a corresponding portion of inlet 104. In other words, airfoil model 110 may be substantially planar or may have a curve corresponding to leading edge curvature 114 of inlet 104.

In this illustrative example, airfoil model 110 is associated with heating system 122. When one component is "associated" with another component, the association is a physical association in these depicted examples. For example, a first component, heating system 122, may be considered to be associated with a second component, airfoil model 110, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, heating system 122 is configured to generate flow 130 of heated air 124 in airfoil model 110. Flow 130 of heated air 124 is generated by heating system 122 in a manner that simulates flow 126 of heated air 128 generated by aircraft engine 106. Heated air 128 from aircraft engine 106 may take the form of bleed air in these illustrative examples. In particular, heating system 122 is configured to simulate flow 126 of heated air 128 within inlet 104 with heated air 124 within airfoil model 110.

In these illustrative examples, flow 130 of heated air 124 may have number of parameters 136. As used herein, a "number of" when used with reference to items means one or more items. For example, number of parameters 136 is one or more parameters. Number of parameters 136 may include temperature 138, flow rate 140, and other suitable parameters.

In this manner, through use of icing simulation environment 100, design of inlet 104 may be tested in test area 120 of wind tunnel 116 under icing conditions 118. As a result, testing of the design of inlet 104 may be less expensive and less time consuming than testing with currently available testing systems.

Figure 2:
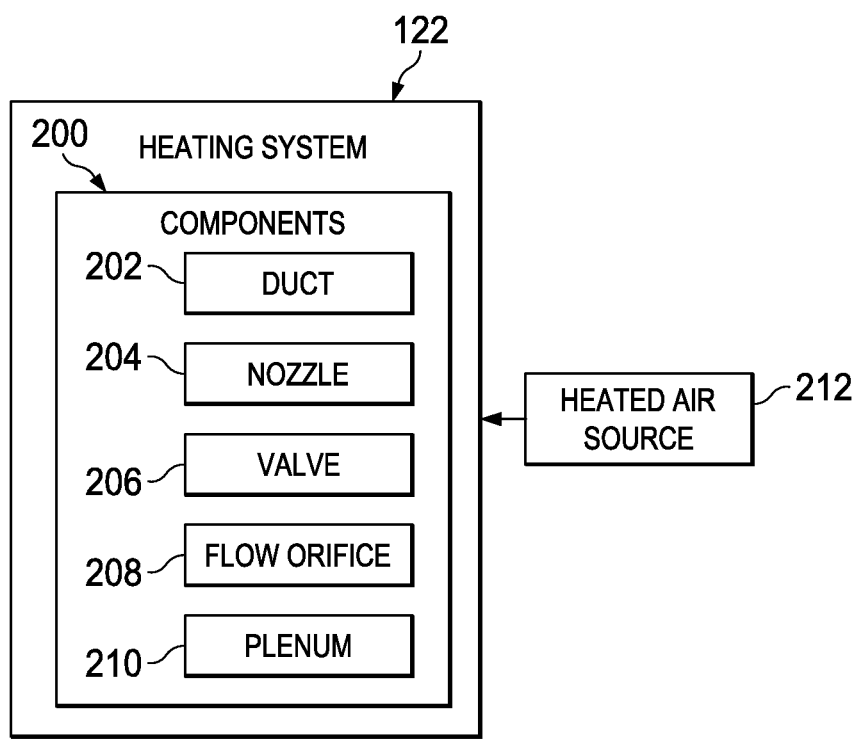
FIG. 2 is an illustration of a block diagram of components that may be used in a heating system in accordance with an illustrative embodiment.

With reference now to FIG. 2, an illustration of a block diagram of components that may be used in a heating system is depicted in accordance with an illustrative embodiment. In this illustrative example, heating system 122 includes one or more of components 200. These components are configured to generate flow 130 of heated air 124 within airfoil model 110 in a manner that simulates flow 126 of heated air 128 in inlet 104 of aircraft engine 106 in FIG. 1.

As depicted, components 200 may include at least one of duct 202, nozzle 204, valve 206, flow orifice 208, plenum 210, heated air source 212, and other suitable components. As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In other examples, "at least one of" may be, for example, without limitation, two of item A, one of item B, and ten of item C; four of item B and seven of item C; and other suitable combinations. In these illustrative examples, one or more of components 200 may be located within interior 132 of airfoil model 110 in FIG. 1.

Duct 202 is a structure with an enclosed passage for conveying a flow of a fluid such as flow 130 of heated air 124. Duct 202 may be rigid or flexible depending on the particular implementation.

Nozzle 204 is a component having an opening configured to regulate flow 130 of heated air 124, direct flow 130 of heated air 124, or both. In these illustrative examples, nozzle 204 may have various sizes and configurations to provide flow 130 of heated air 124 in a desired manner.

As depicted, valve 206 is configured to be associated with duct 202. Valve 206 is configured to control flow 130 of heated air 124 within duct 202 in these illustrative examples. Valve 206 may be adjusted prior to flow 130 of heated air 124 being generated within interior 132 of airfoil model 110, while flow 130 of heated air 124 flows within interior 132 of airfoil model 110, or a combination of the two.

In these illustrative examples, flow orifice 208 is configured to be associated with duct 202 and is a structure configured to change the diameter of a location in duct 202. Flow orifice 208 may be used to increase flow rate 140 of heated air 124 within a portion of duct 202. Further, flow orifice 208 may be placed downstream of valve 206. In this location, flow orifice 208 may be used to adjust flow 130 of heated air 124 from valve 206 more precisely. For example, flow orifice 208 may be configured to increase flow rate 140 of flow 130 of heated air 124 coming from valve 206.

As depicted, plenum 210 is a structure that may take the form of a plate or gate. Plenum 210 may be placed in duct 202 or at an end of duct 202. Plenum 210 is configured to control airflow by increasing friction in duct 202.

Components 200 may be made of various types of materials. For example, without limitation, components 200 may be comprised of polycarbonate, plastic, aluminum, polyvinyl chloride, and other suitable materials. These materials may be selected based on an ability of the materials to perform as desired in circulating heated air 124 within airfoil model 110.

Heated air source 212 is configured to generate flow 130 of heated air 124 in heating system 122. In these illustrative examples, components 200 in heating system 122 may be connected to heated air source 212 to provide flow 130 of heated air 124 within interior 132 of airfoil model 110.

In these illustrative examples, components 200 in heating system 122 are configured to control flow 130 of heated air 124 such that flow 130 of heated air 124 substantially matches air, such as heated air 128 flowing from aircraft engine 106 through inlet 104 for the portion of inlet 104 that airfoil model 110 represents. In other words, flow 130 of heated air 124 may simulate a circulation of heated air 128 within interior 134 of inlet 104. Heated air 128 may travel around interior 134 of inlet 104 for some period of time in these illustrative examples.

In another illustrative example, heated air 124 may simulate heated air from an auxiliary power unit in the aircraft rather than heated air 128 from aircraft engine 106.

The illustration of icing simulation environment 100 and the various components such as components 200 for heating system 122 in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, heated air source 212 may be considered part of heating system 122 rather than as a separate component from heating system 122. In still other illustrative examples, heated air source 212 may be considered part of wind tunnel 116. In yet other illustrative examples, airfoil model 110 also may include a portion of the housing for aircraft engine 106 in addition to inlet 104.

Further, although other illustrative examples are directed toward test object 102 in the form of inlet 104, other illustrative examples may be applied to other structures in aircraft 108. For example, test object 102 may be a portion of a wing, a horizontal stabilizer, a vertical stabilizer, or some other suitable structure in which air flows within the structure from a source in the aircraft for purposes of providing icing protection.

Figure 3:
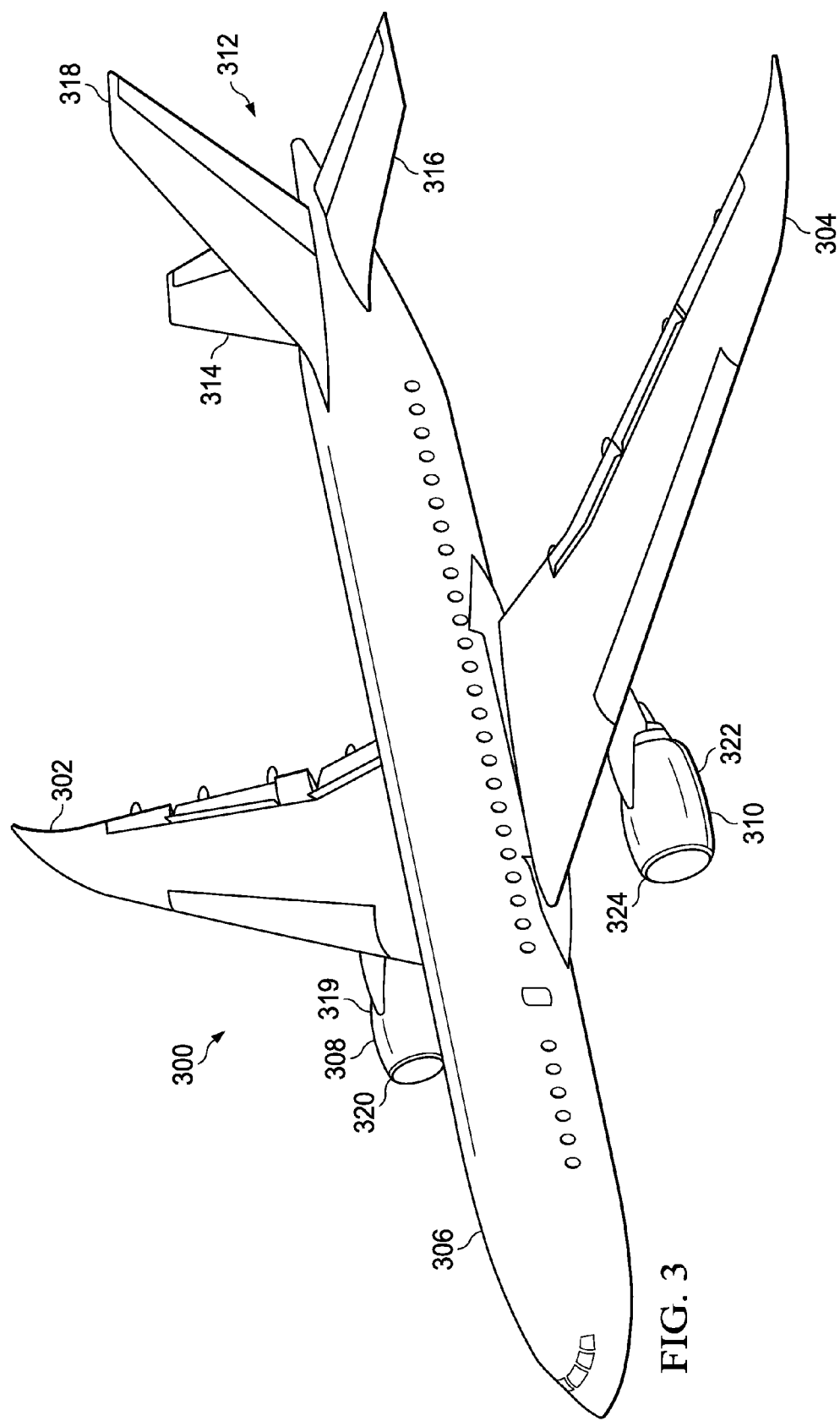
FIG. 3 is an illustration of an aircraft in accordance with an illustrative embodiment.

With reference now FIG. 3, an illustration of an aircraft is depicted in accordance with an illustrative embodiment. In this illustrative example, aircraft 300 has wing 302 and wing 304 attached to body 306. Aircraft 300 includes engine 308 attached to wing 302 and engine 310 attached to wing 304.

Body 306 has tail section 312. Horizontal stabilizer 314, horizontal stabilizer 316, and vertical stabilizer 318 are attached to tail section 312 of body 306.

Aircraft 300 is an example of an aircraft in which an icing protection system may be located, and which may be simulated in icing simulation environment 100 in FIG. 1. For example, engine 308 has housing 319 with inlet 320. Engine 310 has housing 322 with inlet 324. Inlet 320 and inlet 324 are examples of physical implementations for inlet 104 shown in block form in FIG. 1.

These inlets may have a certain interior shape configured to provide icing protection on those portions of aircraft 300 when heated air, such as bleed air from an engine or heated air from an auxiliary power unit, is sent through the interiors of inlet 320 and inlet 324. In particular, air may flow within the interior of inlet 320 and inlet 324 in a manner that reduces the formation of ice, prevents the formation of ice, and melts any ice that may form on the surface of inlet 320 and inlet 324 due to icing conditions in these illustrative examples.

An airfoil model, such as airfoil model 110 in FIG. 1, may be created for inlet 320 and inlet 324 and tested to determine whether the inlet designs provide a desired level of icing protection.

Figure 4:
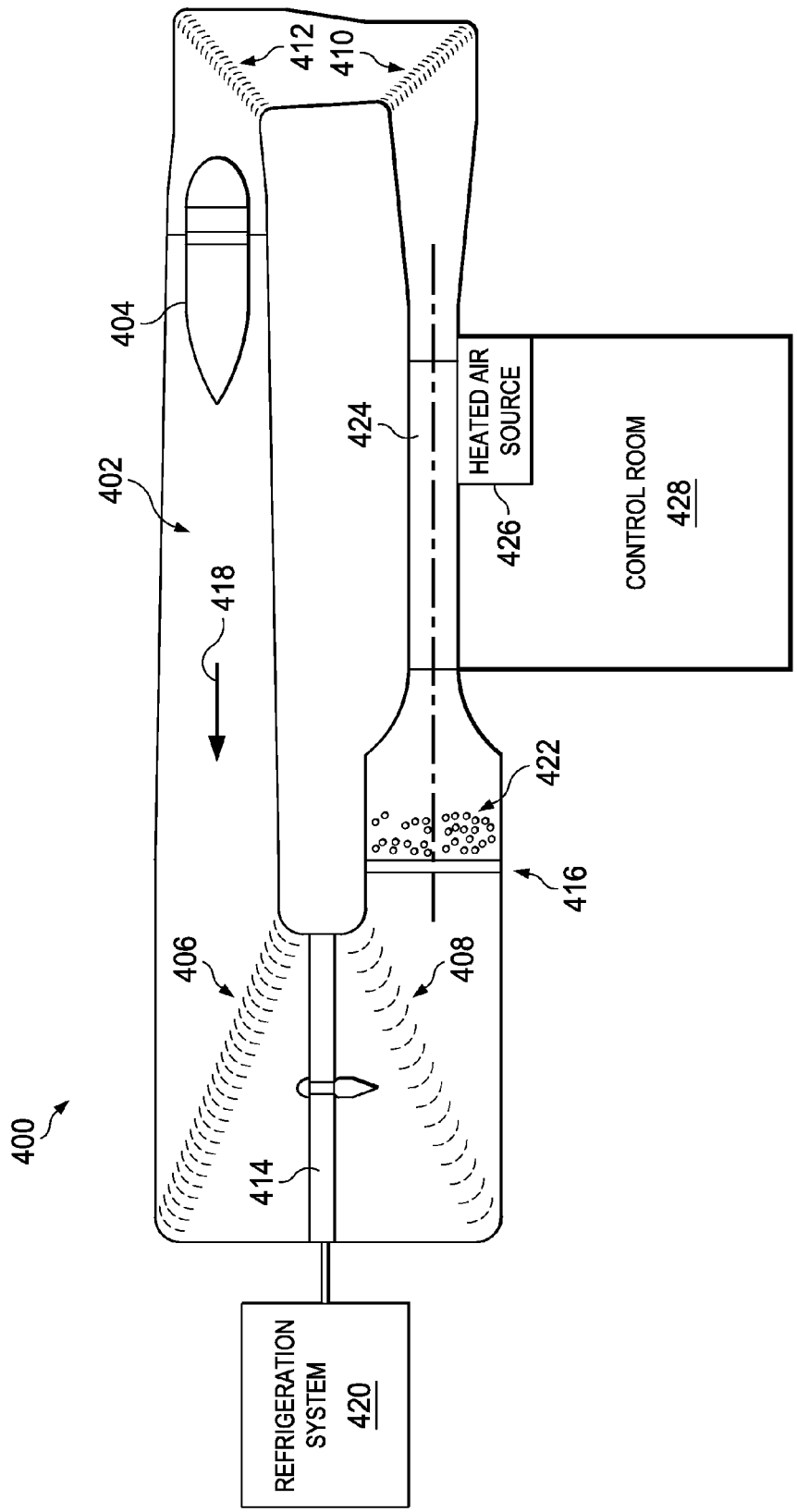
FIG. 4 is an illustration of a wind tunnel in which icing conditions may be simulated in accordance with an illustrative embodiment.

Turning now to FIG. 4, an illustration of a wind tunnel in which icing conditions may be simulated is depicted in accordance with an illustrative embodiment. As depicted, a top view of wind tunnel 400 is shown. Wind tunnel 400 is an example of one implementation of wind tunnel 116 in FIG. 1. As depicted, interior 402 of wind tunnel 400 has airflow generator 404, turning vane 406, turning vane 408, turning vane 410, turning vane 412, heat exchanger 414, spray bars 416, and other suitable components.

As depicted, airflow generator 404 is configured to generate airflow 418 within interior 402 of wind tunnel 400. Airflow generator 404 includes a fan system in this illustrative example. Turning vanes 406, 408, 410, and 412 are configured to aid in directing airflow 418 within interior 402 of wind tunnel 400.

Heat exchanger 414 is connected to refrigeration system 420. Refrigeration system 420 with heat exchanger 414 is configured to cool air within airflow 418. Spray bars 416 are configured to generate drops of water 422 to simulate icing conditions within interior 402 of wind tunnel 400. Drops of water 422 may be supercooled drops in these illustrative examples.

As depicted, test section 424 is the portion of wind tunnel 400 in which a test object may be placed for testing. In these illustrative examples, the test object takes the form of an airfoil model, such as airfoil model 110 in FIG. 1. Further, wind tunnel 400 also may include heated air source 426. Heated air source 426 is configured to generate heated air that may be directed to the test object in these illustrative examples. The operation of wind tunnel 400 is controlled in control room 428.

The illustration of wind tunnel 400 in FIG. 4 is only presented as an illustrative example of one manner in which wind tunnel 116 in FIG. 1 may be implemented. This example is not meant to imply limitations to the manner in which wind tunnel 116 may be implemented for use in testing test object 102, such as airfoil model 110 of inlet 104. For example, other wind tunnels may have other shapes or configurations. Moreover, other wind tunnels may include additional airflow generators in addition to airflow generator 404 and may include other numbers of turning vanes.

Figure 5:
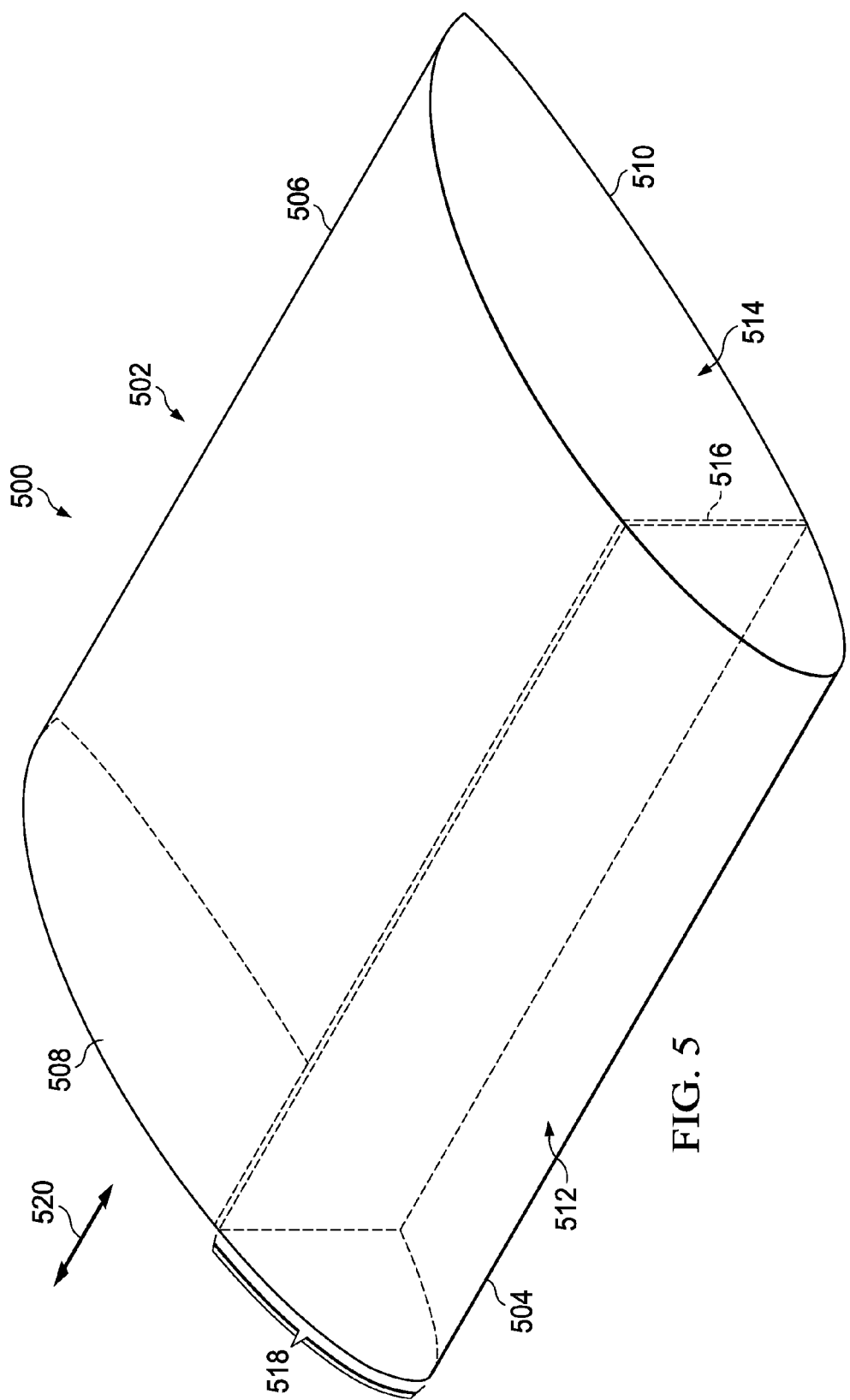
FIG. 5 is an illustration of an airfoil model in accordance with an illustrative embodiment.

With reference now to FIG. 5, an illustration of an airfoil model is depicted in accordance with an illustrative embodiment. In this depicted example, airfoil model 500 is an example of one physical implementation for airfoil model 110 in FIG. 1.

As depicted, airfoil model 500 is an example of a cross section for inlet 320 or inlet 324 on aircraft 300 in FIG. 3. Airfoil model 500 may be placed into test section 424 of wind tunnel 400 for simulating icing conditions.

In these illustrative examples, airfoil model 500 with leading edge cross section 502 represents the geometry for inlet 320. Airfoil model 500 has leading edge 504 and trailing edge 506.

In this illustrative example, airfoil model 500 has surface 508 defined by structure 510. Additionally, airfoil model 500 has interior 512 and interior 514. These two interiors are defined by structure 516, which is shown in phantom in this illustration. Structure 516 may be, for example, a bulk head.

As depicted, leading edge cross section 502 matches a leading edge curvature for inlet 320. In particular, section 518 has a curvature that substantially conforms to a cross section of the leading edge curvature for inlet 320.

In this illustrative example, airfoil model 500 is substantially planar in the direction of arrow 520 rather than curved. Of course, in other illustrative examples, airfoil model 500 also may have a curve in the direction of arrow 520 to match a radial curve for inlet 320. A radial curve for inlet 320 is a curve around an axis extending centrally through engine 310 in FIG. 3.

Turning now to FIG. 6, an illustration of a top view of an airfoil model is depicted in accordance with an illustrative embodiment. In this figure, a top view of airfoil model 500 in FIG. 5 is shown.

In FIG. 7, an illustration of a cross section of an airfoil model is depicted in accordance with an illustrative embodiment. In this depicted example, a cross-sectional view of airfoil model 500 is shown taken along lines 7-7 in FIG. 6. Airfoil model 500 as shown in FIGS. 5-7 is an example of an airfoil model in which a heating system may be implemented to generate a flow of heated air within interior 512 of airfoil model 500.

Figure 8:
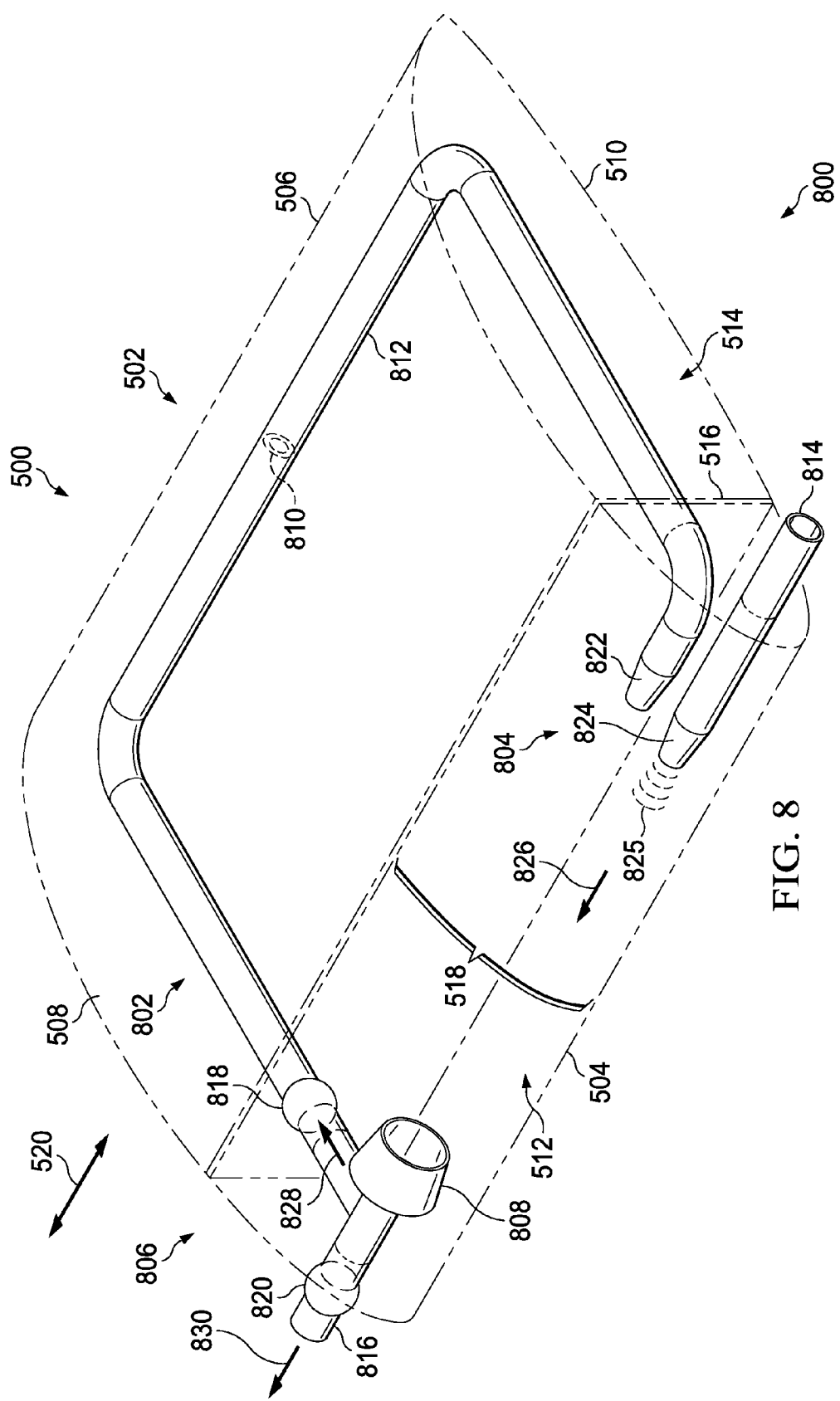
FIG. 8 is an illustration of a heating system in an airfoil model in accordance with an illustrative embodiment.

Turning now to FIG. 8, an illustration of a heating system in an airfoil model is depicted in accordance with an illustrative embodiment. In this depicted example, heating system 800 is an example of one implementation for heating system 122 shown in block form in FIG. 1 and FIG. 2. As depicted, airfoil model 500 is shown in phantom to better illustrate components in heating system 800. As depicted, heating system 800 includes duct system 802, nozzle system 804, valve system 806, plenum 808, and orifice 810.

Duct system 802 includes duct 812, duct 814, and duct 816. Duct 812 and duct 816 are associated with each other. Duct 814 is connected to a heated air source not shown in this illustration. In these illustrative examples, duct system 802 may be insulated to reduce heat loss from a duct to the internal cavity or structure of airfoil model 500 to a desired level. In this manner, a desired level of heat transfer may be provided to simulate the recirculation of heated air within an inlet.

Valve system 806 includes valve 818 and valve 820. Valve 818 is located in duct 812, while valve 820 is located in duct 816. In this illustrative example, orifice 810 is located within duct 812. Plenum 808 is connected to duct 816. Nozzle system 804 includes nozzle 822 and nozzle 824.

Nozzle 824 introduces heated air 825 into interior 512 of airfoil model 500. Nozzle 822 also may be configured to adjust the speed of the air flowing back into interior 512. Nozzle 824 injects heated air 825, and nozzle 822 injects recirculated air in these illustrative examples.

Heated air 825 flows in the direction of arrow 826. As heated air 825 flows within interior 512, the heated air heats surface 508 of airfoil model 500 in section 518.

Heated air 825 may be collected by plenum 808. Depending on the state of valve 820 and valve 818, heated air 825 may flow from plenum 808 into at least one of the direction of arrow 828 and in the direction of arrow 830. When valve 818 is open, heated air 825 flows in the direction of arrow 828. When valve 820 is open, heated air 825 flows in the direction of arrow 830. Valve 818 and valve 820 may be controlled to adjust the flow of heated air 825 in the direction of arrow 828 and in the direction of arrow 830.

Heated air 825 flows in the direction of arrow 828 to simulate the circulation of heated air 825 within an inlet. When heated air 825 flows in the direction of arrow 828 in duct 812, heated air 825 is returned to interior 512 by nozzle 822.

In these illustrative examples, the flow of heated air 825 in the direction of arrow 828 is controlled using valve 818 upstream of orifice 810. These components may control the amount of heated air 825 and the speed of heated air 825 that flows through duct 812. With duct 812, heated air 825 flowing within duct 812 may become cooler.

As a result, duct 812 along with valve 818, orifice 810, and nozzle 822 are configured to simulate various parameters within an inlet. For example, these components may be used to simulate the cooling and speed at which heated air 825 flows within the interior of an inlet as heated air 825 recirculates within the inlet. Valve 820 in duct 816 may be configured to simulate the exit of heated air 825 from an inlet.

Turning now to FIG. 9, an illustration of a top view of an airfoil model with a heating system is depicted in accordance with an illustrative embodiment. As depicted, a top view of airfoil model 500 with heating system 800 from FIG. 8 is shown.

Next, in FIG. 10, an illustration of a cross-sectional view of an airfoil model with a heating system is depicted in accordance with an illustrative embodiment. In FIG. 10, a cross-sectional view of airfoil model 500 with heating system 800 is shown in a cross-sectional view taken along lines 10-10 in FIG. 9.

Figure 11:
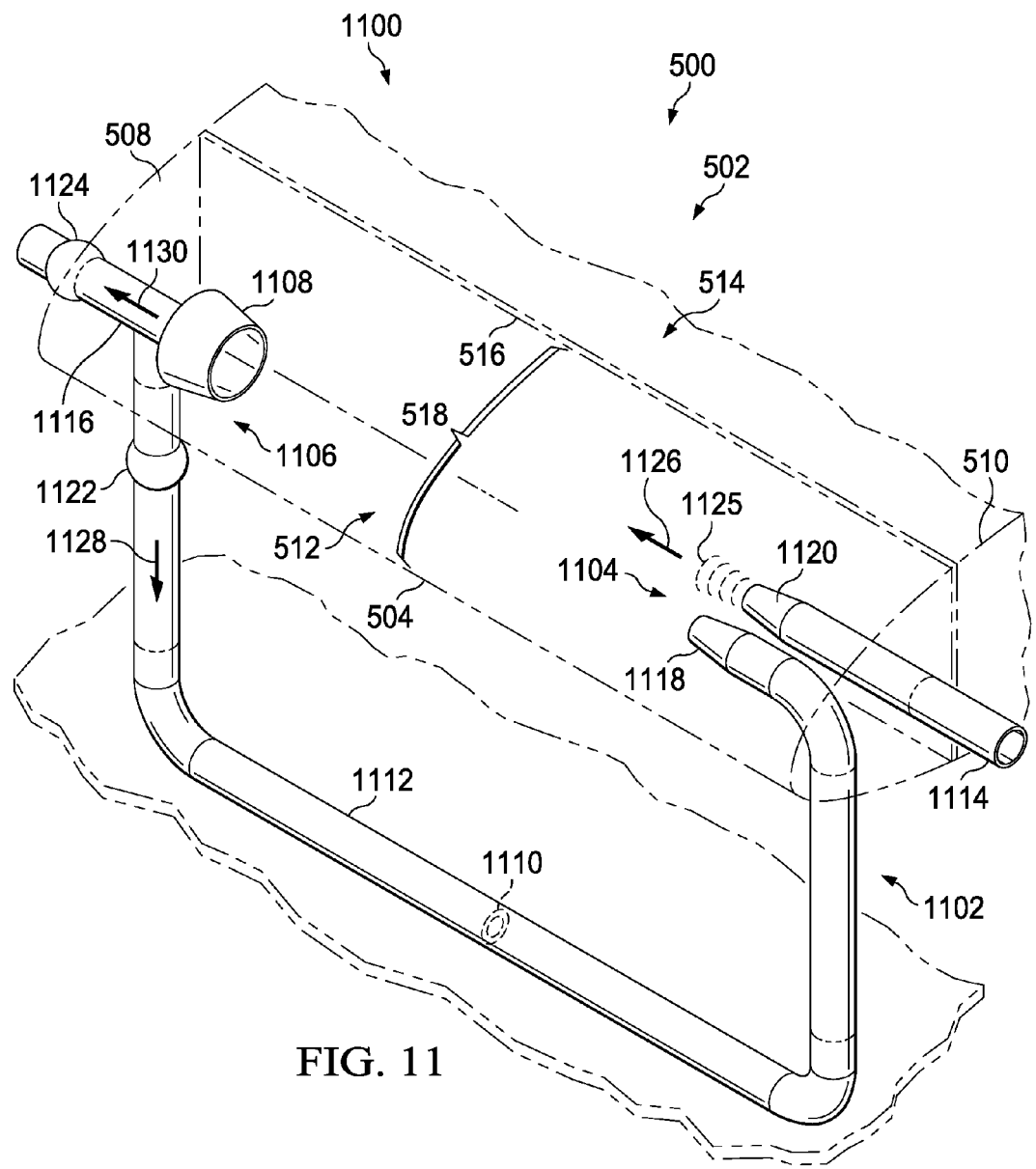
FIG. 11 is an illustration of an alternate configuration for a duct system within a heating system in accordance with an illustrative embodiment.

Turning now to FIG. 11, an illustration of an alternate configuration for a duct system within a heating system is depicted in accordance with an illustrative embodiment. In this example, heating system 1100 is an example of another configuration for a heating system that may be used in airfoil model 500. Specifically, heating system 1100 may be one configuration for heating system 122 in FIG. 1.

In this depicted example, duct system 1102 is only present within interior 512 of airfoil model 500 and not within interior 514 of airfoil model 500. As depicted, structure 510 and structure 516 are shown in phantom to illustrate various components for heating system 1100.

As illustrated, heating system 1100 includes duct system 1102, nozzle system 1104, valve system 1106, plenum 1108, and orifice 1110. As depicted, duct system 1102 includes duct 1112, duct 1114, and duct 1116.

Nozzle system 1104 includes nozzle 1118 and nozzle 1120. Valve system 1106 includes valve 1122 and valve 1124. Duct 1114 in duct system 1102 is connected to a heated air source not shown in this illustration. Duct system 1102 may be insulated to reduce heat loss to a desired level.

Nozzle 1120 introduces heated air 1125 in the direction of arrow 1126 into interior 512 of airfoil model 500. Heated air 1125 enters plenum 1108 and may travel in at least one of the direction of arrow 1128 and in the direction of arrow 1130. These directions are controlled by valve 1122 and valve 1124 in duct 1112 and duct 1116, respectively.

As can be seen in this configuration of duct system 1102, a portion of duct 1112 is located outside of structure 510. In other words, duct 1112 may extend into the interior of the wind tunnel farther beyond and outside of the wind tunnel walls as needed to simulate the length of the engine air duct used in the aircraft to obtain heated air from the aircraft engine. Duct 1112 may be insulated to reduce the amount of cooling may occur. The amount of insulation and the length of duct 1112 is configured to simulate the flow of air within inlet 320 in FIG. 3.

Figure 12:
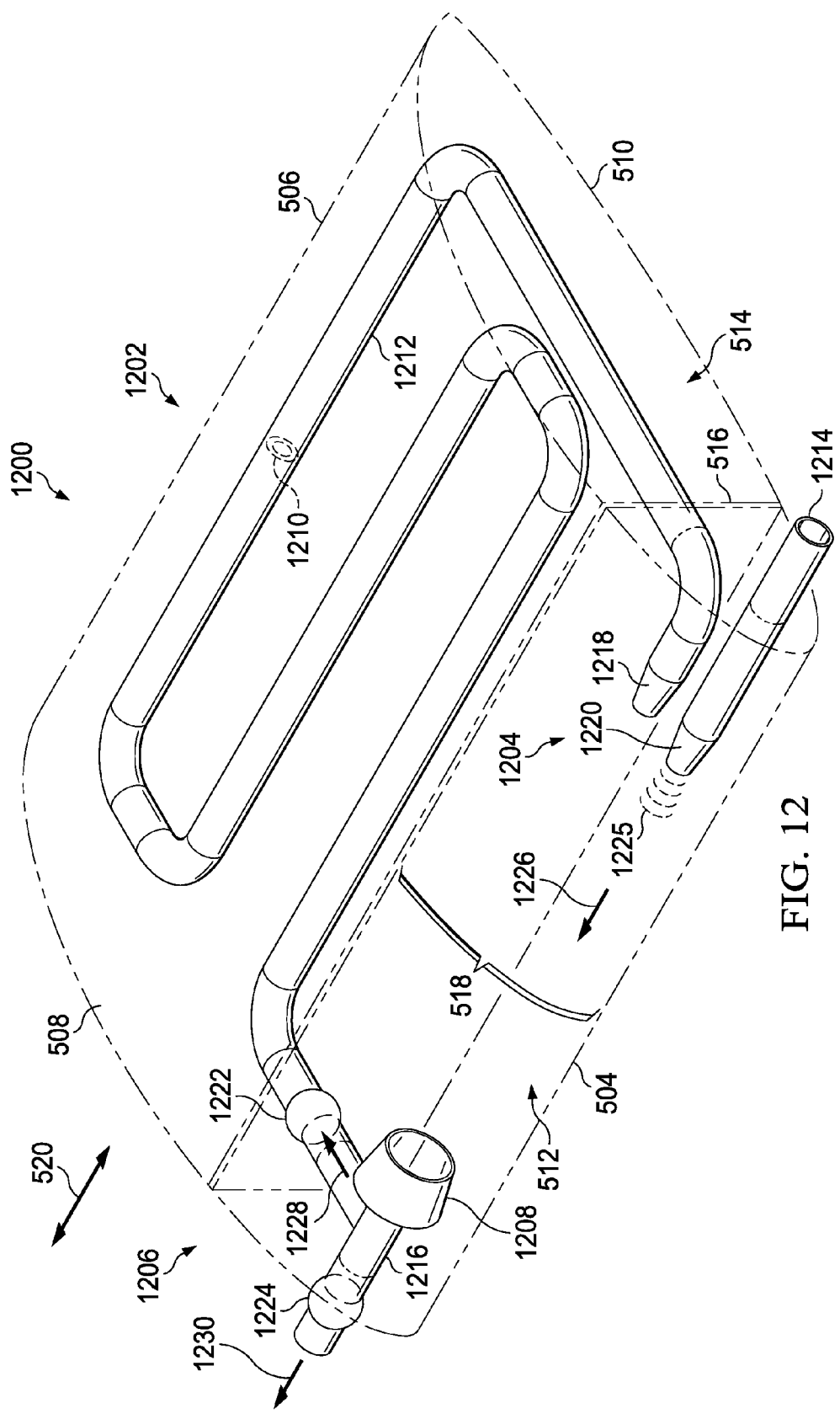
FIG. 12 is another illustration of an alternate configuration for a duct system within a heating system in accordance with an illustrative embodiment.

With reference now to FIG. 12, another illustration of an alternate configuration for a duct system within a heating system is depicted in accordance with an illustrative embodiment. In this depicted example, heating system 1200 includes duct system 1202, nozzle system 1204, valve system 1206, plenum 1208, and orifice 1210. As depicted, duct system 1202 includes duct 1212, duct 1214, and duct 1216. Duct system 1202 may be insulated to reduce heat loss to a desired level. Materials for insulation of duct system 1202 may be selected from at least one of fiberglass, foam, and other suitable materials.

Nozzle system 1204 includes nozzle 1218 and nozzle 1220. Nozzle 1218 is associated with duct 1212 and nozzle 1220 is associated with duct 1214.

Valve system 1206 includes valve 1222 and valve 1224. Valve 1222 is located in duct 1212 and valve 1224 is located in duct 1216. Plenum 1208 is associated with duct 1216. Orifice 1210 is located within duct 1212.

In this illustrative example, duct 1214 is connected to a heated air source not shown in this illustration and provides flow of heated air 1225 in the direction of arrow 1226. Plenum 1208 may receive heated air 1225 flowing within interior 512 in airfoil model 500 and heated air 1225 may travel in at least one of the direction of arrow 1228 and in the direction of arrow 1230 as controlled by valve 1222 and valve 1224, respectively.

In this illustrative example, duct system 1202 is located within airfoil model 500. Duct 1212 has a shape and configuration to simulate the flow of air around inlet 320 in FIG. 3. The length of duct 1212 is selected to simulate the distance that the heated air flows around inlet 320 to return to the cross section of inlet 320 as modeled by leading edge cross section 502 of airfoil model 500.

The illustration of airfoil model 500 and the different heating systems that may be used with airfoil model 500 in FIGS. 5-12 are not meant to imply limitations to the manner in which other illustrative embodiments may be implemented. The different configurations of heating systems are presented only as illustrations of some examples of implementations for heating system 122 shown in block form in FIG. 1 and FIG. 2. Other heating systems may include other components in addition to or in place of the ones illustrated as well as other configurations for the components illustrated in the figures.

For example, an additional duct with another nozzle may be included in addition to the nozzle used to introduce air into airfoil model 500 from a heated air source. Additionally, more than one duct may be used to recirculate air within airfoil model 500 rather than the single duct as illustrated in these examples.

Figure 13:
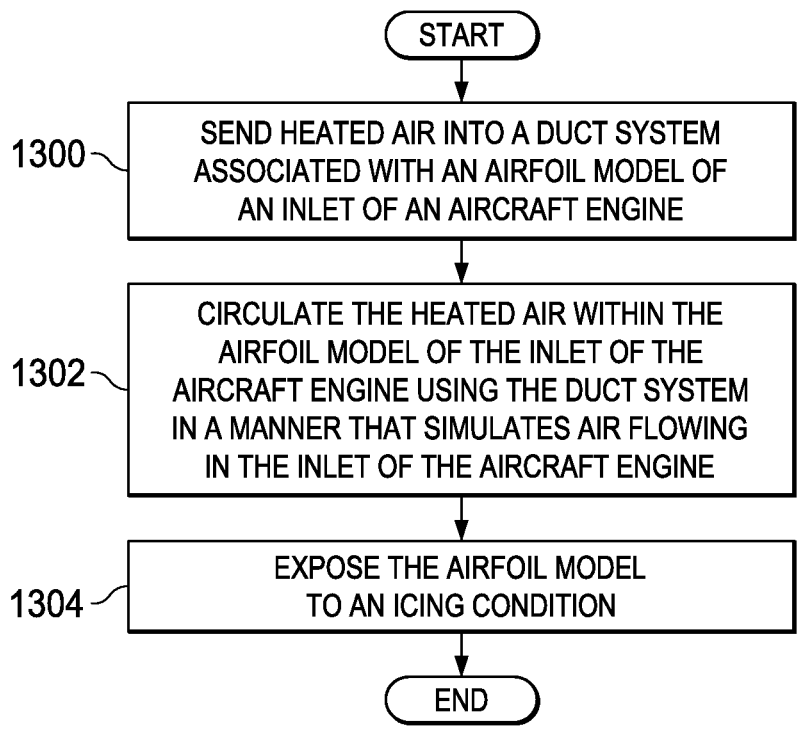
FIG. 13 is an illustration of a flowchart of a process for generating a flow of heated air in an airfoil model of an inlet for an aircraft in accordance with an illustrative embodiment.

With reference now to FIG. 13, an illustration of a flowchart of a process for generating a flow of heated air in an airfoil model of an inlet for an aircraft is depicted in accordance with an illustrative embodiment. The process illustrated in FIG. 13 may be implemented in icing simulation environment 100 in FIG. 1. In particular, the process may be implemented using heating system 122 for airfoil model 110 in FIG. 1.

The process begins by sending heated air into a duct system associated with an airfoil model of an inlet of an aircraft engine (operation 1300). The process then circulates the heated air within the airfoil model of the inlet of the aircraft engine using the duct system in a manner that simulates air flowing in the inlet of the aircraft engine (operation 1302).

The process then exposes the airfoil model to an icing condition (operation 1304), with the process terminating thereafter. In this illustrative example, the airfoil model may be subjected to an icing condition in a wind tunnel configured to generate icing conditions. In other illustrative examples, the airfoil model may be mounted onto an aircraft and flown in actual icing conditions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1304 may be performed prior to operation 1302. In some illustrative examples, both operation 1302 and operation 1304 may be performed at the same time.

Figure 14:
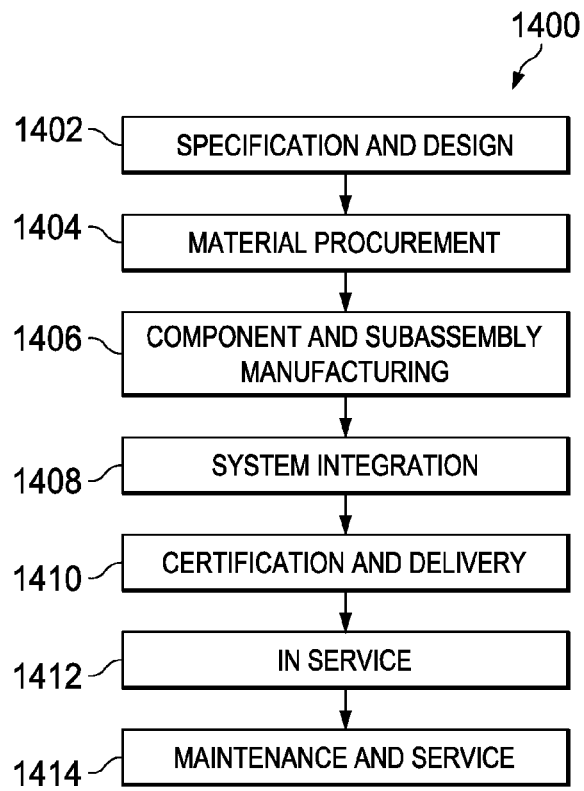
FIG. 14 is an illustration of an aircraft manufacturing and service method in accordance with an illustrative embodiment.
Figure 15:
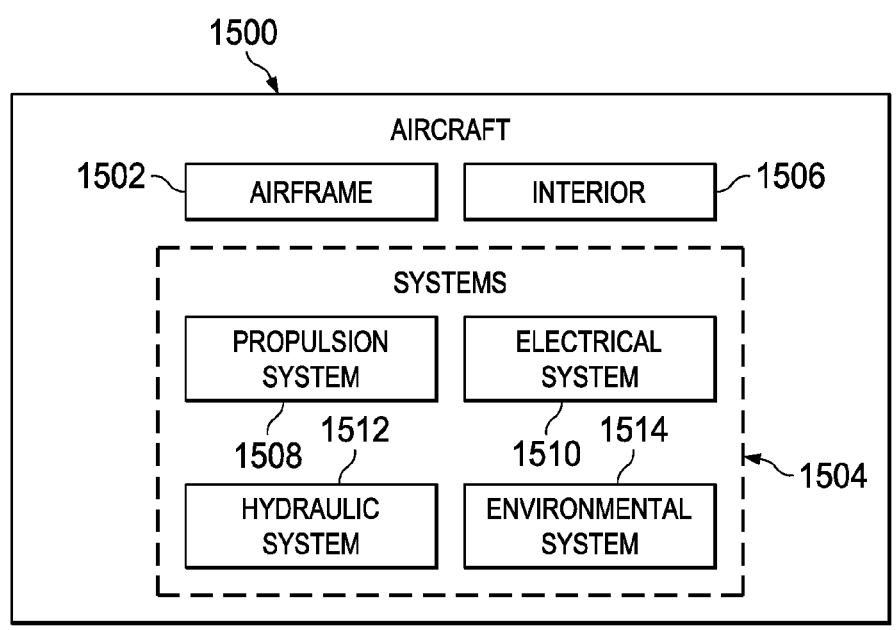
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Testing of airfoil model 110 may occur during one of the phases of manufacturing and service method 1400.

Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. Aircraft 1500 may be one example of aircraft 108 in FIG. 1 and aircraft 300 in FIG. 3. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. One or more illustrative embodiments may be implemented during specification and design 1402 to test designs of icing protection systems used on aircraft 1500.

As another example, one or more illustrative embodiments may be used during certification and delivery 1410 to certify that icing protection designs may perform as desired. Further, one or more illustrative embodiments may be used during maintenance and service 1414 when new icing conditions are designed or implemented in aircraft 1500 during maintenance, upgrades, refurbishment, or other operations performed on aircraft 1500.

Thus, the illustrative embodiments provide a method and apparatus for simulating an ice protection system in a wind tunnel that generates icing conditions. In these illustrative examples, the illustrative embodiments may be used to simulate an icing protection system for an inlet for the aircraft engine that uses heated air to provide icing protection. The illustrative examples may reduce the complexity and time needed to simulate icing conditions for an airfoil model for the inlet.

The illustrative embodiments provide a more accurate simulation of the operation of an icing protection system as compared to using electric heater mats that are installed on the inner surface of the leading edge of an airfoil model. In this manner, the illustrative embodiments may use actual airflow and temperatures that may be found in bleed air from an engine, heated air from an auxiliary power unit, or other sources in an aircraft.

Further, the illustrative embodiments also provide an ability to replicate the flow of heated air. This replication includes the flow rate, the distance that the heated air flows in the inlet, and the circular routing of the heated air within the interior of the inlet. As a result, the illustrative embodiments provide more accurate results and may reduce the amount of flight testing needed to determine whether an icing protection system performs as desired.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a heating system configured to generate a flow of heated air in an airfoil model representing a portion of an inlet of an aircraft engine in which the flow of the heated air simulates air flowing in the inlet of the aircraft engine, the heating system comprising:
a duct system associated with the airfoil model, wherein the duct system is configured to recirculate the heated air in a manner to simulate air flowing in a remainder of the inlet of the aircraft engine, and wherein the duct system has a length selected to simulate the air flowing in the remainder of the inlet of the aircraft engine; and
a nozzle system configured to direct the heated air within the airfoil model, wherein the nozzle system includes a first nozzle configured to direct the heated air into the airfoil model from a heated air source and a second nozzle configured to direct the heated air recirculated by the duct system in the airfoil model.

2. The apparatus of claim 1 further comprising:
the airfoil model.

3. The apparatus of claim 1, wherein the heating system is associated with a wind tunnel configured to simulate icing conditions.

4. The apparatus of claim 1, wherein the heating system further comprises at least one of a valve, a flow orifice, or a plenum.

5. The apparatus of claim 1, wherein the airfoil model has a leading edge and an interior corresponding to a cross section of the inlet.

6. The apparatus of claim 1, wherein the air flowing in the inlet of the aircraft engine is bleed air.

7. The apparatus of claim 1, wherein the heated air has a number of parameters selected from at least one of a temperature or a flow rate.

8. The apparatus of claim 1, wherein the duct system further comprises:
insulation configured to reduce heat loss to a desired level.

9. A method for generating a flow of heated air in an airfoil model representing a portion of an inlet of an aircraft engine, the method comprising:
sending the heated air into a duct system associated with the airfoil model;
circulating the heated air within the airfoil model using the duct system in a manner that simulates air flowing in the inlet of the aircraft engine, wherein the heated air is recirculated in a manner that simulates circulation of the air flowing within a remainder of the inlet of the aircraft engine, and wherein the duct system has a length selected to simulate the air flowing within the remainder of the inlet of the aircraft engine; and
directing the heated air within the airfoil model using a nozzle system, wherein the nozzle system includes a first nozzle configured to direct the heated air into the airfoil model from a heated air source and a second nozzle configured to direct the heated air recirculated by the duct system in the airfoil model.

10. The method of claim 9, wherein circulating the heated air within the airfoil model using the duct system in the manner that simulates the air flowing in the inlet of the aircraft engine comprises:
circulating the heated air within the airfoil model using the duct system in the manner that simulates the air flowing in the inlet of the aircraft engine while the airfoil model is exposed to icing conditions.

11. The method of claim 10, wherein the icing conditions are generated in a wind tunnel.

12. The method of claim 9, wherein circulating the heated air within the airfoil model using the duct system in the manner that simulates the air flowing in the inlet of the aircraft engine comprises:
circulating the heated air within the airfoil model using the duct system in a manner that simulates a flow rate of the air flowing in the inlet of the aircraft engine.

13. The method of claim 9, wherein circulating the heated air within the airfoil model using the duct system in the manner that simulates the air flowing in the inlet of the aircraft engine comprises:
circulating the heated air within the airfoil model using the duct system in a manner that simulates a temperature of the air flowing in the inlet of the aircraft engine.

14. The method of claim 9, wherein circulating the heated air within the airfoil model using the duct system in a manner that simulates air flowing in the inlet of the aircraft engine further comprises circulating the heated air within the airfoil model using the duct system and at least one of the nozzle system or a valve system in a manner that simulates the air flowing in the inlet of the aircraft engine.

15. An apparatus comprising:
a heating system configured to generate a flow of heated air in an airfoil model representing a portion of an aircraft structure configured to be exposed to icing conditions during operation of an aircraft, the heating system comprising:
a duct system associated with the airfoil model, wherein the duct system is configured to recirculate the heated air in a manner to simulate air flowing in a remainder of the aircraft structure, and wherein the duct system has a length selected to simulate the air flowing in the remainder of the aircraft structure;
a nozzle system configured to direct the heated air within the airfoil model, wherein the nozzle system includes a first nozzle configured to direct the heated air into the airfoil model from a heated air source and a second nozzle configured to direct the heated air recirculated by the duct system in the airfoil model; and
a plenum connected to the duct system and configured to collect the heated air within the airfoil model to direct at least a portion of the heated air into the duct system.

16. The apparatus of claim 15, wherein the nozzle system is configured to adjust a speed of the recirculated heated air.

17. The apparatus of claim 15, wherein a portion of the duct system is located outside of the airfoil model.

18. The apparatus of claim 15, wherein the aircraft structure is selected from one of an inlet of an aircraft engine, a wing, a horizontal stabilizer, or a vertical stabilizer.

19. The apparatus of claim 15, wherein the first nozzle and the second nozzle are configured to direct the heated air in a common direction within the airfoil model.

* * * * *